United States Patent [19]

Palm et al.

[11] Patent Number: 4,530,043
[45] Date of Patent: Jul. 16, 1985

[54] DC SWITCHING VOLTAGE CONVERTER FOR MULTIPLYING AN INPUT DC VOLTAGE WITHOUT INCREASING THE SWITCHING CONDUCTION PERIOD

[75] Inventors: Erich J. Palm; Christianus H. J. Bergmans, both of Eindhoven, Netherlands

[73] Assignee: U.S. Philips Corporation, New York, N.Y.

[21] Appl. No.: 645,519

[22] Filed: Aug. 28, 1984

Related U.S. Application Data

[63] Continuation of Ser. No. 438,124, Nov. 1, 1982, abandoned.

[30] Foreign Application Priority Data

Nov. 16, 1981 [NL] Netherlands ............. 8105159

[51] Int. Cl.³ ............................ H02P 13/22
[52] U.S. Cl. .................... 363/21; 315/408; 315/411; 323/222
[58] Field of Search ............ 363/21, 97; 315/408, 315/411; 323/222

[56] References Cited

U.S. PATENT DOCUMENTS

| | | | |
|---|---|---|---|
| 3,912,972 | 10/1975 | Otten et al. | 315/411 |
| 4,099,101 | 7/1978 | Teuling | 315/408 |
| 4,161,675 | 7/1979 | Zappala | 315/408 |

FOREIGN PATENT DOCUMENTS 1556235 11/1979 United Kingdom

*Primary Examiner*—William H. Beha, Jr.
*Attorney, Agent, or Firm*—William J. Streeter

[57] ABSTRACT

A DC voltage to DC voltage converter where the period of a controllable switch is maintained for a period which produces current and voltage levels which will not damage any of the converter circuit elements. First and second voltage supply networks are provided, each comprising an inductor, one end of which is an input of the voltage supply network, the other end connected to first and second diodes. The second diode serially connects the inductor with a capacitor. The junction of the capacitor and second diode correspond to an output of the voltage supply network. The second voltage network receives the output of the first voltage network. The first diodes of each voltage network are connected to a transistor switch which is terminated by serially connected third and fourth diodes. A winding serially connected the junction of the third and fourth diodes with the second network output voltage junction. A tuning capacitor across the fourth diode establishes a resonant current in the winding. A signal from the winding is coupled to the transistor switch for changing the state of the transistor switch. Voltages across the transistor switch are established by the resonant tuning capacitor to a safe level. The converter is useful for providing horizontal deflection in a picture display device.

5 Claims, 2 Drawing Figures

DC SWITCHING VOLTAGE CONVERTER FOR MULTIPLYING AN INPUT DC VOLTAGE WITHOUT INCREASING THE SWITCHING CONDUCTION PERIOD

This is a continuation of application Ser. No. 438,124, filed Nov. 1, 1982, now abandoned.

The invention relates to a circuit for converting an input d.c. voltage into an output d.c. voltage which is substantially independent of variations in the input voltage and/or variations of a load connected to the output voltage. The circuit is of the type having an inductance connected to a first terminal of the input voltage source and whose other end is connected to the series arrangement of a first diode and a controllable switch, connected to the second terminal of the voltage source. The switch which is periodically controlled during operation. A series arrangement of a second diode and a capacitor, are also connected from the inductor is other terminal to the second terminal of the input voltage. A series arrangement of a third and a fourth diode is in parallel with the switch, the first and second diodes having the same conductivity direction as the switch, while the conductivity direction of the third and the fourth diode is opposite thereto. The circuit further comprises a winding one end of which is coupled to the junction of the second diode and the capacitor and whose other end is connected to the junction between the third and the fourth diode which forms part of a resonant network with a tuning capacitor a. A sawtooth-shaped current flows in operation through the winding while energy is stored in the inductance for replenishing losses and the period during which the switch conducts depends on the output voltage or a voltage proportional thereto.

BACKGROUND OF THE INVENTION

Such a circuit is disclosed in the British Patent Specification No. 1,556,235. One or more stabilised supply voltages are obtained with this known circuit. It appears that the voltage across the capacitor is higher than the input voltage, more specifically by a factor which depends on the ratio of the conduction period of the controllable switch to the period of the control signal thereof, so that the voltage across the capacitor can be kept substantially constant by controlling said ratio. The turning by means of the tuning capacitor limits the voltage across the switch during the period of time it is not conducting to a level which is not too high, and transients which might be produced by parasitic capacitances and which might cause undesirable radiation do not occur.

In practice the multiplying factor obtained with the prior art circuit cannot be of any arbitrary high value. This would imply that said ratio would come very close to 1, which might endanger the control properties of the circuit. In that event the recharging current of the capacitor would furthermore flow in a very short period of time and would consequently have a very high value, which might be too high for the circuit elements through which it flows.

OBJECT OF THE INVENTION

The invention has for its object to provide a circuit of the above-described type, having a single controllable switch, it being possible to multiply the input voltage by a high factor without the ratio of the conduction period of the switch to its period approaching very closely to 1.

SUMMARY OF THE INVENTION

To that end, according to the invention, the circuit further comprises one or more supply networks each incorporating an inductance, a first and a second diode and a capacitor, the series arrangement formed by the inductance, the second diode and the capacitor of a supply network being in parallel with a capacitor of another supply network located closer to the input voltage source. The first diode of the supply network under consideration is connected by means of one end to the junction of the inductance and the second diode of the same supply network. At the other end to the junction between the switch and the third diode. The end of the winding which is not connected to the third and the fourth diodes is connected to the junction between the second diode and the capacitor of the supply network located the most remotely from the input voltage source. The first and the second diodes of each supply network have the same conductivity direction as the switch.

The circuit may be used in a picture display device, the control signal of the controllable switch being the line frequency, where a line deflection coil is connected to the junction between the third and the fourth diode.

BRIEF DESCRIPTION OF THE DRAWINGS

The invention will now be further described by way of example with reference to the accompanying drawing. Wherein.

Figure 1:
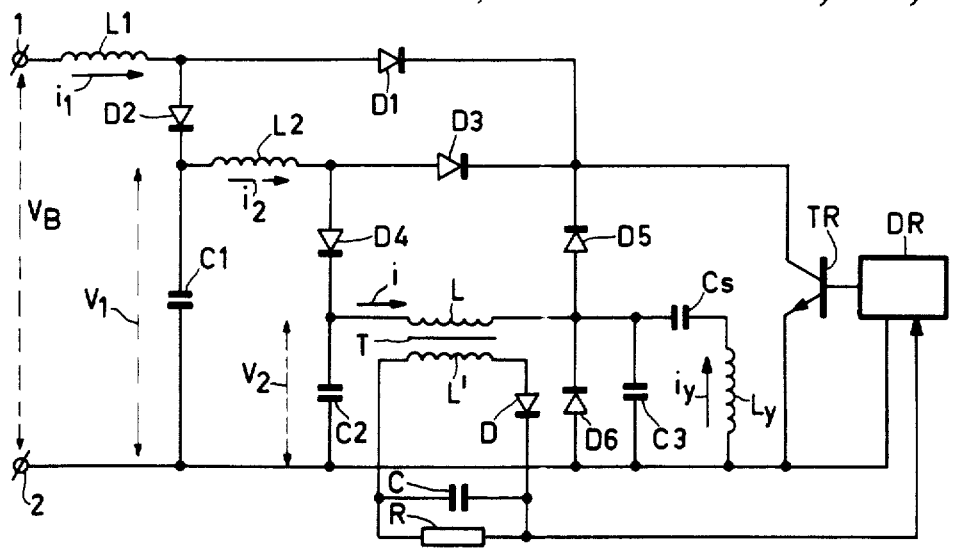
FIG. 1 shows an embodiment of the circuit in accordance with the invention (and)

In the circuit shown in FIG. 1 an inductance L1 is connected to the positive terminal 1 of a supply voltage source $V_B$. The other end of inductance L1 is connected to the anode of a first diode D1 and to the anode of a second diode D2. The cathode of diode $D_2$ is connected to a capacitor C1, whose other end is connected to the negative terminal 2 of source $V_B$, and to an inductance L2, whose other end is connected to the anode of a further diode D3 and to the anode of a diode D4. The cathode of diode D4 is connected to a capacitor C2, whose other end is connected to terminal 2, and to the primary winding L of a transformer T, whose other end is connected to the anode of a diode D5 and to the cathode of a diode D6. The anode of diode D6 is connected to terminal 2 and a capacitor C3 is arranged in parallel therewith. The cathodes of diodes D1, D3 and D5 are interconnected and connected to the collector of an npn-switching transistor TR, whose emitter is connected to terminal 2, while a driver stage DR is included in the base lead for producing periodic switching pulses. A secondary winding L' of transformer T is connected to a rectifier D, whose other electrode is connected to a smoothing capacitor C, winding L' being connected by means of its other end to the other terminal of capacitor C. A load R is arranged in parallel with capacitor C. If so desired, winding L' may be d.c. isolated from winding L.

During operation, during a portion of the period of the switching signal from driver stage DR diode D6 is conducting, while transistor TR is in the cut-off state. A current i flows through winding L and capacitor C2. If the capacitance of this capacitor is large, then the voltage $V_2$ thereacross is substantially constant during the entire period, so that the variation of current i (see FIG.

Figure 2:
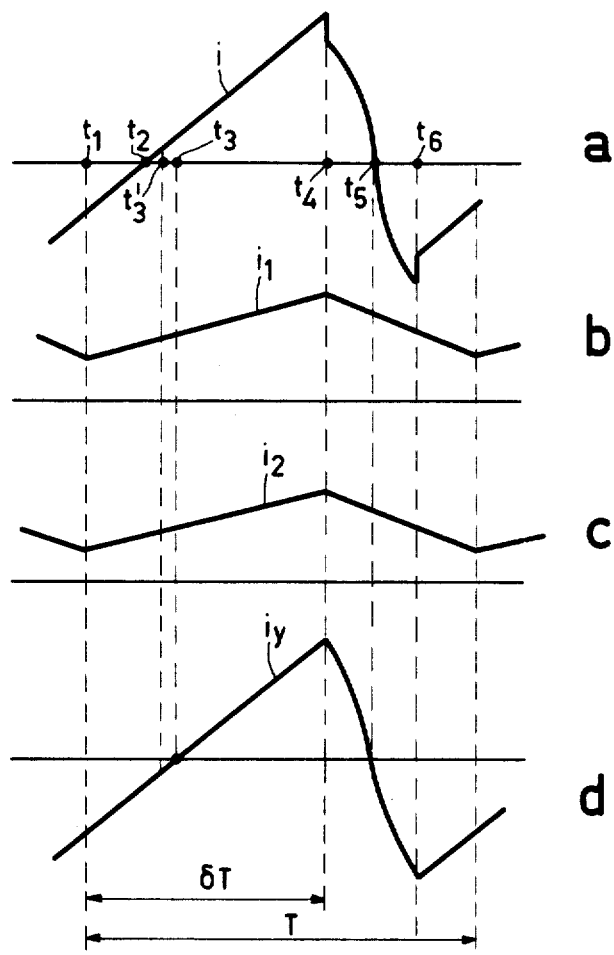
FIG. 2 shows waveforms occurring therein.

2a) is substantially linear. The energy previously stored in inductance L1 produces a current $i_1$ therethrough, which also flows through diode D2 and capacitor C1. With an adequately large capacitance of capacitor C1 the voltage $V_1$ thereacross is substantially constant and also the variation of current $i_1$ (see FIG. 2b) is substantially linear. In the same manner the energy stored in inductance L2 produces a current $i_2$ which flows through this inductance and through diode D4 and capacitor C2, whose variation (see FIG. 2c) is substantially linear. From the preceding it appears that the voltage across inductance L1 is equal to $V_B - V_1$, while the voltage across inductance L2 is equal to $V_1 - V_2$ and that diodes D1, D3 and D5 are non-conducting. As will appear hereafter, voltage $V_1$ is higher than $V_B$, while voltage $V_2$ is higher than voltage $V_1$, so that the voltages across inductances L1 and L2 are negative. Consequently, currents $i_1$ and $i_2$ decrease.

At an instant $t_1$ transistor TR is made conductive by a positive switching pulse applied to its base. Current $i$ continues to flow in the same manner as prior to instant $t_1$. Current $i_1$ now flows through diode D1 and transistor TR, while current $i_2$ flows through diode D3 and transistor TR. The voltage at the junction between elements L1, D1 and D2, which was equal to $V_1$, and the voltage at the junction between elements L2, D3 and D4, which was equal to $V_2$, are now substantially zero. Diodes D2, D4 and D5 carry no current. The voltage across inductance L1 is equal to $V_B$ while the voltage across inductance L2 is equal to $V_1$. From this it appears that the currents $i_1$ and $i_2$ now increase in a substantially linear way. Current $i_1$ withdraws energy from source $V_B$ while current $i_2$ withdraws energy from voltage $V_1$, so also from source $V_B$. In this way losses are replenished.

In practice the values of inductances L1 and L2 will be chosen such that currents $i_1$ and $i_2$ cannot become zero. However, the inductance value of winding L is much lower so that current $i$, more specifically at an instant $t_2$, becomes zero and thereafter reverses its direction. It now flows through diode D5, which was currentless while the voltage thereacross was substantially zero, and through transistor TR. It is then, however, a condition that transistor TR is made conductive in due time.

In response to a negative pulse applied to its base transistor TR is now cut-off at an instant $t_4$. Current $i_1$ now flows again through diode D2, while current $i_2$ flows through diode D4. The voltage at the junction of elements L1, D1 and D2 again assumes the value $V_1$, while the voltage at the junction of the elements L2, D3 and D4 again assumes the value $V_2$. Currents $i_1$ and $i_2$ decrease again.

After instant $t_4$ current $i$ flows through capacitor C3 which prior to that instant was short-circuited, either by diode D6, or by the series arrangement formed by diode D5 and transistor TR. The capacitance of capacitor C3, which is many times less than the capacitance of capacitor C2 which is now in series therewith, is chosen in such a manner that by these capacitors and by the inductances and the other capacitances in the circuit a resonant network is formed whose resonance frequency is higher than the repetition frequency of the drive signal of transistor TR. In these circumstances a substantially cosinusoidal voltage which is positive and keeps diode D6 in the non-conductive state is produced at the cathode of diode D6. Also diodes D1 and D3 are non-conductive while diode D5 is currentless.

Owing to the losses in the circuit and because current is supplied to load R, current $i$ has during the linear portion thereof a direct current component and instant $t_2$ is located prior to the central instant $t_3$ of this portion. After instant $t_4$ the current which flows through capacitors C2 and C3 cannot contain a direct current component. At this instant the primary current of transformer T is subjected to a very fast variation. This negative sudden variation is equal to the said component. Thereafter, current $i$ decreases in a substantially sinusoidal manner and becomes zero at the instant $t_5$ at which the voltage at the cathode of diode D6 reaches a maximum, whereafter the current reverses its direction. At an instant $t_6$ the said voltage becomes zero again, as a result of which diode D6 is made conductive. Because of the symmetry of the sine wave, instant $t_5$ is located in the centre of the interval between $t_4$ and $t_6$. At instant $t_6$ the oscillation stops and the voltage of capacitor C2 is applied across winding L. Current $i$ is submitted to the same sudden variation as at instant $t_4$, now, however, in the positive direction, whereafter it increases in a substantially linear manner. This is the same situation as prior to instant $t_1$.

The amplitude of the high voltage present across winding L between the instants $t_4$ and $t_6$ depends on the ratio of the interval between these instants to the period and consequently on the resonant frequency, while the voltage across winding L during the remaining portion of the period is substantially equal to voltage $V_2$. The choice of the resonance frequency makes it possible to ensure that the voltage at the collector of transistor TR between instants $t_4$ and $t_6$, which is the same as the voltage at the cathode of diode D6, cannot become higher than the maximum value allowed for this transistor.

The voltage across winding L' has substantially the same shape as the voltage across winding L. The winding sense of winding L' as well as the conductivity direction of rectifier D can be chosen in such a manner that the rectifier is in the conductive state, either during a portion of the interval between $t_4$ and $t_6$, or during a portion of the remainder of the period, for applying a current to capacitor C. The voltage across this capacitor is fed back to driver stage DR for influencing the conductivity period of transistor DR in such a known manner that the said voltage remains constant. In these circumstances other direct voltages which are generated by means of further secondary windings, not shown, of transformer T and which are proportional to the voltage across capacitor C, are also substantially constant. Also voltage $V_2$ is substantially constant.

If the time interval between instants $t_1$ and $t_4$ in which transistor TR conducts is designated $\delta T$, T denoting the period of the switching signal, then the equations by means of which it is expressed that the average voltages across inductances L1 and L2 are zero can now be written as follows:

$$V_B \cdot \delta T = -(V_B - V_1)(1-\delta)T$$

and $$V_1 \cdot \delta T = -(V_1 - V_2)(1-\delta)T.$$

From this it appears that $$V_1 = (V_B/1-\delta) \text{ and } V_2 = (V_1/1-\delta) = V_B/(1-\delta)^2$$

and consequently, in view of the fact that ratio δ is less than unity, that voltage $V_1$ is higher than $V_B$ and that voltage $V_2$ is higher than $V_1$.

The circuit can be extended by interrupting the connection between winding L and the junction between elements D4 and C2 and by connecting a supply network which incorporates an inductance, a capacitor and two diodes, and whose construction is the same as the networks L1, D1, D2, C1 and L2, D3, D4, C2, by means of one end to capacitor C2 and by means of its other end to winding L, the cathode of the first diode of the additional supply network being connected to the junction between the cathodes of diodes D1, D3 and D5 and the collector of transistor TR. In a similar manner as the first network L1, D1, D2, C1 is connected to voltage $V_B$ and the second network L2, D3, D4, C2 is connected to voltage $V_1$, this third network is connected to voltage $V_2$. It will be clear that the circuit obtained in this manner operates in a similar way as the circuit shown in FIG. 1 and that the voltage connected across winding L during the time interval prior to instant $t_4$ is equal to $V_B/(1-\delta)^3$. This is the voltage across the capacitor of the third supply network. If the circuit comprises n networks of the same type as the above-mentioned networks, then the said voltage will be equal to $V_B/(1-\delta)^n$. In this situation no account is taken of the fact that one or more elements of the circuits may be connected to taps of the several inductances, which furnishes further degrees of freedom for the design of the circuit. The multiplying factor obtained may consequently be rather high without the ratio approaching very close to unity, which might endanger the control properties of the circuit. In addition, in that event the recharging currents of the capacitors would flow in a very short period of time and would consequently have very high values which might be too high for the elements through which these recharging currents flow.

The circuit is suitable for use for the generation of one or more stabilized supply voltages for loads connected to these voltages. The circuit may, for example, be used in a picture display device, for example a television receiver. If the line frequency is chosen for the repetition rate of the drive signal applied to transistor TR, then the circuit of FIG. 1 or a variant decribed in the foregoing can be combined with the line deflection circuit. The series arrangement formed by a line deflection coil $L_y$, i.e. the coil for the deflection in the horizontal direction of one or more electron beams generated in a picture display tube, and a capacitor $C_s$ for the S-correction may be arranged in parallel with diode D6. This is shown in FIG. 1 for the case two supply networks are used.

If elements $C_s$ and $L_y$ are arranged in the circuit in the above-described way, the operation prior to instant $t_2$ is the same as the operation described in the foregoing. As diode D6 is conductive, coil $L_y$ is connected to the voltage of capacitor $C_s$. The line deflection current $i_y$ caused thereby (see FIG. 2d) increases, more specifically in a substantially linear way, if, for the sake of simplicity, the capacitance of capacitor $C_s$ is assumed to be very large. Disregarding a possible, small centering current, current $i_y$ does not contain a direct current component. At the instant $t_2$ at which current i becomes zero, current $i_y$ is consequently not yet zero. Diode D6 remains in the conducting state. After instant $t_2$ current i flows through this diode in the cut-off direction thereof, the diode being maintained in the conducting state by current $i_y$. However, the absolute value of current $i_y$ decreases and becomes zero at the central instant $t_3$ of the line flyback period. A short time before instant $t_3$ currents i and $i_y$ have the same absolute values at an instant $t'_3$, causing diode D6 to stop conducting. Both currents now flow through diode D5, which was currentless, while the voltage thereacross was substantially zero, and through transistor TR. Between instants $t'_3$ and $t_3$ current $i_y$ has a low value and can consequently flow through transistor TR and diode D5, which are kept in the conducting state by the other currents, in the cut-off direction thereof. After instant $t_3$ current $i_y$ flows through diode D5 and transistor TR in the conducting direction of both these elements. Thereafter the circuit operates in the same way as described in the foregoing.

With such a combined supply and line deflection circuit δ must satisfy certain requirement. In this case transistor TR must be conducting at least between instants $t'_3$ and $t_4$. If, namely, after instant $t'_3$ transistor TR has not yet become conductive the voltage at the collector thereof increases, so that the late turn-on of the transistor produces a large dissipation and may even result in the transistor being damaged. For a line period of approximately 64 μs and a line flyback time of approximately 12 μs, this implies that ratio δ may vary between the values 52/64=0.8 and 26/64=0.4, so that voltage $V_1$ is variable between approximately 1.7 $V_B$ and 5 $V_B$, while voltage $V_2$ is variable between approximately 2.8 $V_B$ and 25 $V_B$. The time between the instants $t'_3$ and $t_3$ is assumed to be very short. From this it appears that the circuit considerably multiplies the input voltage applied to it without the ratio δ approaching very closely to unity, and that consequently the circuit is suitable for uses in which the input voltage is low, for example if it is the voltage of a battery. It will be noted that also the condition that the period of time between instants $t_4$ and $t_6$ is substantially equal to the prescribed line flyback period must be satisfied, which determines the value of the resonance frequency by means of tuning capacitor C3.

In the foregoing, the input voltage is connected between terminals 1 and 2. It should be noted that the input voltage may be connected to the terminals of capacitor C1, resulting in the above-mentioned multiplying effect by means of network L2, D3, D4, C2 and further similar networks being obtained, while network L1, D1, D2, C1 then has no function. In a similar manner the input voltage can be connected to capacitor C2 or to a further capacitor. This idea may be used in an apparatus which can be fed by both a 12 V (direct voltage) battery and by the 220 V (alternating voltage) electric power mains. The battery is then connected to terminals 1 and 2, while a direct voltage, obtained by means of a mains transformer and a rectifier, is connected to capacitor C1 or to a further capacitor, a selector switch ensuring that the two input voltages cannot be operative simultaneously. In this way the transformation ratio of the mains transformer may have a value which is near to 1:1, so that the efficiency thereof is much higher than in the case the rectified voltage was 12 V. This results in a considerable saving in energy, which may be considered as an advantage of the circuit. It will be obvious that also inductances L1 and/or L2 may be in the form of primary windings of transformers whose secondary windings can be used for loads and/or a line deflection circuit, while winding L need not be a primary winding of a transformer. In this situation, the control of ratio δ may be effected in dependence on a primary or a secondary voltage from one of these transformers or in dependence on voltage $V_2$ or a similar capacitor voltage, which may also function as an output voltage.

It will be obvious that FIG. 1 shows a simplified circuit diagram, it being possible to use a number of known variants, for example by arranging capacitor C3 in parallel with one of the windings of transformer T or with coil Ly, and wherein known elements may be added. Such an element is, for example, a linearity correction arrangement for coil Ly. Transistor TR may be replaced by any type of known electronic switches, for example by a gate turn-off switch. Via capacitor $C_3$ line deflection coil Ly may be connected to winding L or to a winding coupled thereto. Thus there is described an example of the invention defined more particularly by the claims which follow.

What is claimed is:

1. A DC voltage to DC voltage converter having an output DC voltage substantially independent of input DC voltage changes and load changes, comprising:
   first and second terminals for receiving an input DC voltage;
   first and second voltage supply networks, each network including an inductor having one end connected to first and second like polarized diodes, said second diode having a remaining end connected to a capacitor first end forming an output voltage junction, said capacitor having a second end connected to said second terminal;
   said first voltage supply network inductor remaining end connected to said first terminal, said second voltage supply network inductor remaining end connected to said first supply output voltage junction;
   a switch connected between the first diode remaining end of each voltage supply network and said second terminal;
   third and fourth serially connected diodes disposed in parallel with said switch, said first diodes, third and fourth diodes connected in a polarity to supply current of a single direction to pass through said switch;
   a winding connecting the junction of said third and fourth diodes with said second voltage supply network output voltage junction;
   a tuning capacitor connected to form a resonant circuit with said winding during at least part of a cut-off time of said switch; and
   means coupled to said winding and said switch for controlling the operation of said switch by means of a periodic switching signal alternately into the conducting and the nonconducting states, respectively, such that the ratio of the conduction time of said switch to the period of said switching signal is proportional to the voltage across said winding.

2. A circuit as claimed in claim 1, wherein the output voltage is the voltage present across the capacitor of a voltage supply network.

3. A circuit as claimed in claim 1, wherein a rectifier is coupled to said winding for generating the output voltage.

4. A circuit as claimed in claim 1 for use in a picture display device, the control signal of the controllable switch being of the line frequency, wherein a line deflection coil is connected to the junction between the third and the fourth diodes and to said second terminal.

5. A circuit as claimed in claim 1, for use in a picture display device, the control signal of the controllable switch being of the line frequency, wherein a line deflection coil is coupled to said winding.

* * * * *